United States Patent
Milton et al.

[15] 3,703,105
[45] Nov. 21, 1972

[54] COLLAPSIBLE SHIFT TUBE ASEMBLY
[72] Inventors: Thomas J. Milton, Bay City; John W. Skelley, Saginaw, both of Mich.
[73] Assignee: General Motors Corporation, Detroit, Mich.
[22] Filed: Aug. 20, 1971
[21] Appl. No.: 173,411

[52] U.S. Cl. ................................74/492, 287/58 CT
[51] Int. Cl. .............................................B62d 1/18
[58] Field of Search ............74/492, 493; 287/58 CT

[56] References Cited

UNITED STATES PATENTS 3,373,629   3/1968   Wight et al. ................74/492

FOREIGN PATENTS OR APPLICATIONS 1,126,071   9/1968   Great Britain...............74/492

*Primary Examiner*—Milton Kaufman
*Attorney*—W. E. Finken et al.

[57] ABSTRACT

In a preferred form, this disclosure relates to a collapsible shift tube assembly having a cylindrical upper member, a cylindrical lower member, and a locking sleeve. The upper member which is received within the lower member has a plurality of circumferentially spaced slots in its lower end portion, and the lower member has a plurality of circumferentially spaced slots in its upper end portion. The sleeve is located intermediate of the upper and lower members and has radially inwardly and outwardly extending projections which are received within the slots of the upper and lower members respectively for joining the lower members to normally prevent relative angular movement therebetween. The joining means also has a radially extending flange means which is cooperable with the lower end of the upper member and the upper end of the lower member for normally preventing axially inward collapse of the shift tube assembly and which is shearable upon a predetermined axial load of the shift tube assembly to allow the shift tube assembly to collapse axially inward.

3 Claims, 6 Drawing Figures

PATENTED NOV 21 1972         3,703,105

INVENTORS
Thomas J. Milton, &
BY John W. Skelley
W. A. Schuetz
ATTORNEY

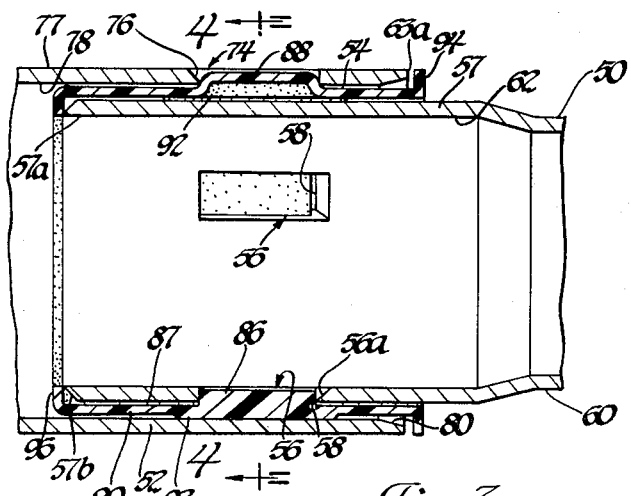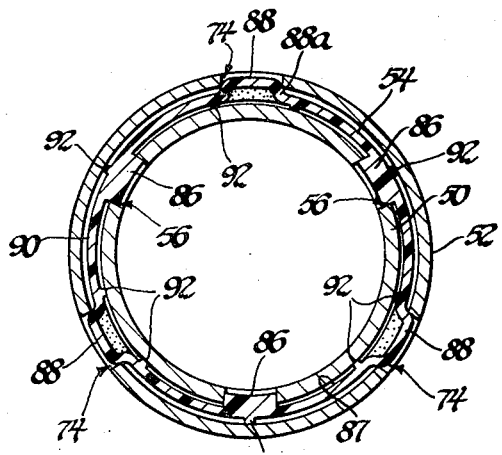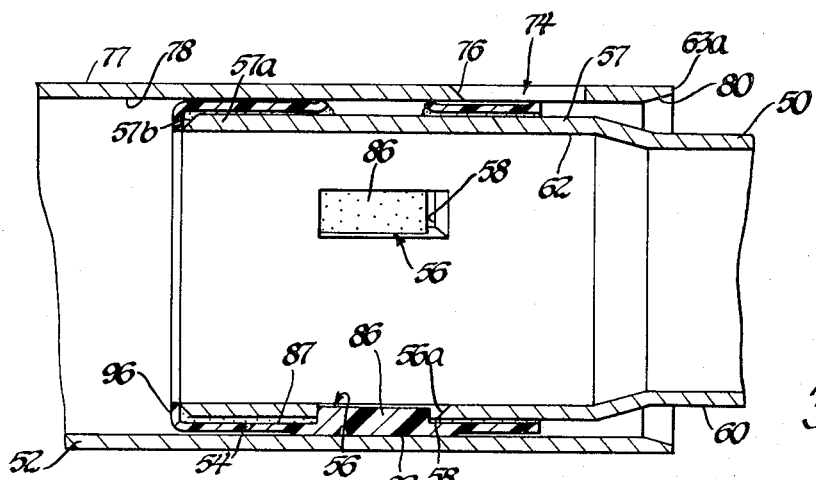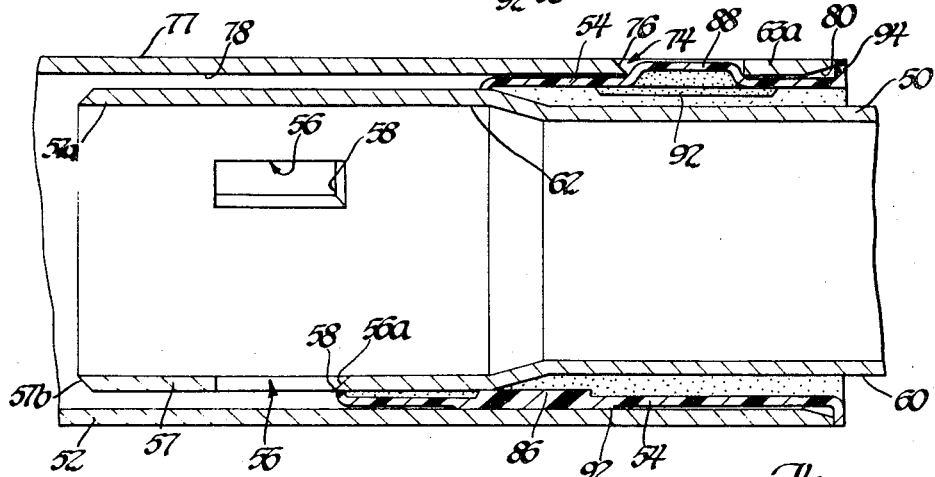

COLLAPSIBLE SHIFT TUBE ASEMBLY

The present invention relates to a shift tube assembly for a steering column assembly, and more particularly to a shift tube assembly which is collapsible axially inward upon an axial force in excess of a predetermined magnitude upon the shift tube assembly.

In present collapsible steering column assemblies, it has been common practice to have the cylindrical component members of the shift tube assembly normally joined to prevent relative angular movement therebetween and axial collapse by a plurality of plastic shear keys which are molded in situ between the component members. For example see U.S. Pat. No. 3,373,629. In those assemblies, the plastic shear keys are sheared upon an axial force in excess of a predetermined magnitude on the shift tube assembly to allow the shift tube assembly to collapse axially inward with the other collapsible components of the steering column assembly. Further, steering column assemblies have heretofore been provided with upper and lower outer column members joined by an intermediate plastic sleeve carrying a plurality of deformable balls between the upper and lower members which are deformed upon a predetermined axial load to permit axial collapse of the assembly. For example, see U.S. Pat. No. 3,538,783.

An object of the present invention is to provide a new and improved collapsible shift tube assembly for use in a collapsible steering column assembly in which the shift tube assembly includes a cylindrical upper member which has a plurality of circumferentially spaced slots in its lower end portion, a hollow lower member which is shaped generally complementary to the upper member and has the lower end of the upper member received within its upper end and which has a plurality of circumferentially spaced slots in its upper end portion, and a locking sleeve which is located intermediate the upper and lower members and which has radially inwardly and outwardly extending projections received within the slots of the upper and lower members for joining the upper and lower members to normally prevent relative angular movement therebetween, and in which the joining means also has radially extending flange means cooperable with the lower end of the upper member and the upper end of the lower member for normally preventing axially inward collapse of the shift tube assembly, and wherein the flange means is shearable upon an axial force in excess of a predetermined magnitude on the shift tube assembly to allow the upper and lower members to collapse or move axially relative to one another.

Another object of the present invention is to provide a new and improved collapsible shift tube assembly, as defined in the preceding object, and in which the locking sleeve has a plurality of circumferentially spaced and axially extending spacer ribs which project radially outward and inward and are engageable with the upper end portion of the lower member and the lower end portion of the upper member to stabilize the shift tube assembly.

These and other objects of the present invention are accomplished, in the preferred embodiment, by providing a collapsible shift tube assembly having a generally cylindrical upper member with a plurality of circumferentially spaced and axially extending slots adjacent its lower end portion and having a cam surface adjacent its lower end portion. The assembly also includes a hollow cylindrical lower member which has a plurality of circumferentially spaced and axially extending slots adjacent its upper end portion and having a cam surface adjacent its upper end portion. Further, the shift tube assembly includes a hollow, cylindrically shaped locking sleeve which is slidably receivable within the upper end of the lower member and over the lower end of the upper member. The locking sleeve has a plurality of radially inwardly extending, relatively non-resilient projections and a plurality of radially outwardly extending, resilient projections which are circumferentially elongated to allow limited expansion of the locking sleeve. The radially inwardly extending tabs are engaged and deflected radially outward by the cam surface of the upper member to effect expansion of the resilient locking sleeve when the locking sleeve is slidably received on the upper member until the radially inwardly extending projections are aligned with the slots whereupon the resilient locking sleeve contracts and the projections are received within the slots of the upper member to connect the locking sleeve and upper member. The radially outward extending projections are engaged and deflected radially inwardly by the cam surface of the lower member when the locking sleeve is slidably received within the lower member until the radially outwardly extending projections are aligned with the slots whereupon the projections deflect outwardly and are received within the slots to connect the locking sleeve and lower member and also to normally prevent relative angular movement between the upper and lower members. The locking sleeve also includes a radially inward extending flange at its lower end which is engageable with the lower end of the upper member when the locking sleeve is slidably received thereon. The locking sleeve further includes a radially outward extending flange at its upper end which is engageable with the upper end of the lower member when the locking sleeve is slidably received therein. The radially inward and outward extending flanges normally serve to prevent axially inward collapse of the shift tube assembly and are shearable upon an axial force in excess of a predetermined magnitude on the assembly to allow the shift tube assembly to collapse axially inward.

These and other objects of the invention will become more fully apparent from the following description and drawing wherein.

Figure 2:
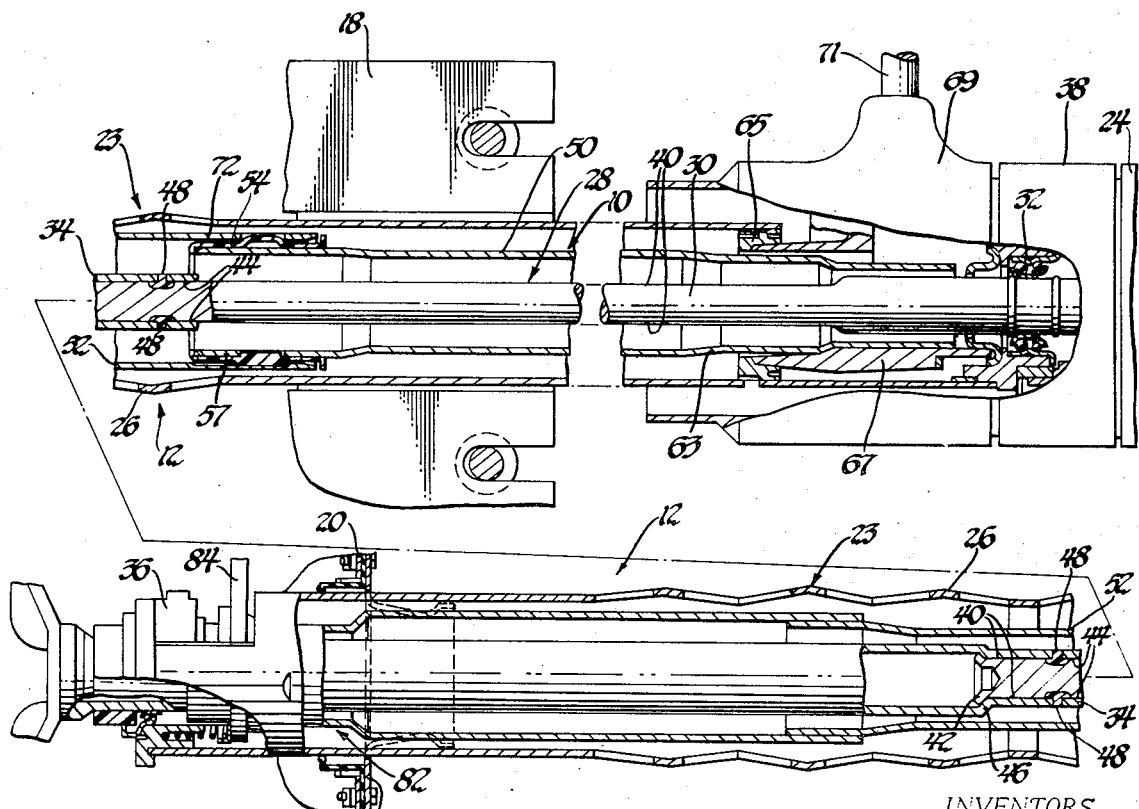
FIG. 2 is an enlarged sectional view of the steering column assembly taken approximately along line 2—2 in FIG. 1.

FIGS. 3, 5, and 6 are enlarged views of a portion of the steering column assembly shown in FIG. 2 and with different parts in different positions; and FIG. 4 is a sectional view taken approximately along line 4—4 in FIG. 3.

As representing a preferred embodiment of the present invention, the drawings show a collapsible shift tube assembly 10 within a collapsible steering column assembly 12 in an automotive vehicle 14. The steering column assembly 12 is mounted below an instrument panel 16 in the vehicle 14 and secured to a support or bracket 18 intermediate its ends. The steering column assembly 10 extends through a fire wall 20 in the vehicle 14 which separates the passenger compartment 21 of the vehicle 14 from the forward body compartment 21a and the assembly 10 is mounted at the fire wall 20 to a bracket 22.

The steering column assembly 12 includes, in addition to the shift tube assembly 10, a collapsible steering column 23 which extends from the end of the steering column assembly 12 which projects into the passenger compartment 21 where it supports the steering wheel 24, through the support 18, and to the fire wall 20. The steering column 23 serves as a support to which the other components of the steering column assembly 12 are mounted, as will later be described. It also serves to absorb the energy from impacts upon the steering column assembly 12 which causes an axially inward collapse of the assembly 12. To this end, the steering column 23 is provided at a location intermediate the fire wall 20 and the support 18 with an energy absorbing mesh 26 which is constructed of a network of intersecting and interconnected strips which will yield and undergo a certain degree of plastic deformation while it collapses.

Figure 1:
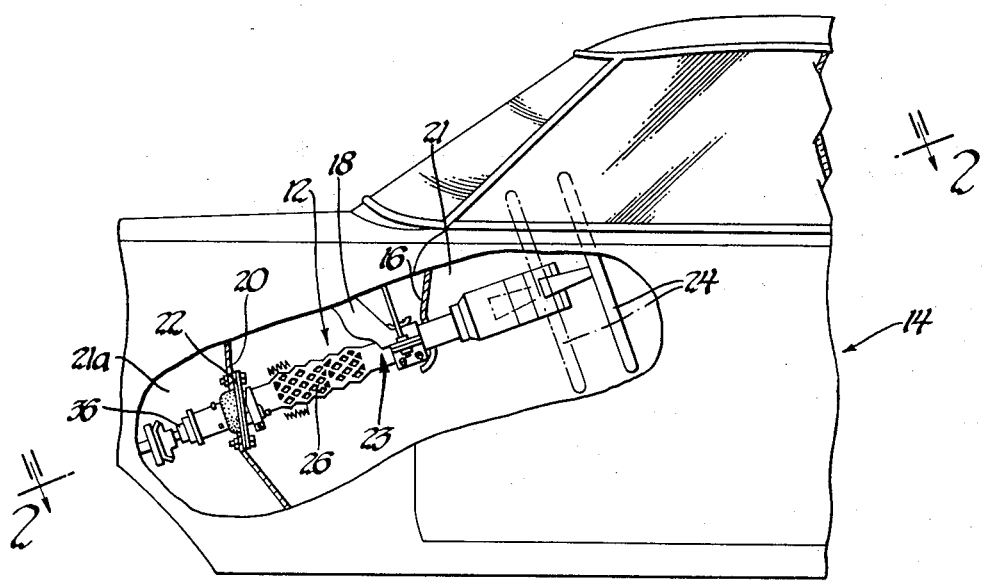
FIG. 1 is a fragmentary side elevation view of an automotive vehicle with portions removed to show a steering column assembly having the present invention embodied therein.

Referring to FIG. 2, the steering column assembly 12 includes a steering shaft assembly 28 which has its upper end drivingly connected with the steering wheel 24 and its lower end received within a housing of a steering gear (not shown) and serves to transfer the movement of the steering wheel 24 to the steering gear for steering the vehicle 14. The steering shaft assembly 28 comprises a shaft member 30 which is supported near its upper end by a bearing 32 which is fixedly mounted to the steering column 23 and which has its lower end received within a sleeve member 34. The sleeve member 34 has its lower end rotatably supported in an adapter 36, as shown in FIGS. 1 and 2. The shaft member 30 is splined or otherwise secured at its upper end to a hub 38 of the steering wheel 24. The shaft member 30 has a pair of parallel flat surfaces 40 on its opposite sides which extend from its lower end for substantially its entire length and which terminate at a position adjacent its upper end. The shaft member 30 also includes a flared portion 42 which extends outwardly at the lower end of the member 30. The sleeve member 34 has its upper end shaped generally complementary to the lower end portion of the shaft member 30 and has the lower end of the shaft member 30 received within its upper end. In this respect, the sleeve member 34 includes a pair of parallel flat surfaces 44 which are engaged with and cooperate with the flat surfaces 40 of the shaft member 30 to prevent relative angular movement therebetween. The flared portion 42 of the shaft member 30 cooperates with a necked down portion 46 of the sleeve member 34 which terminates in the flat surfaces 44 to prevent outward telescoping of the steering shaft assembly 28. Further, the shaft member 30 and the sleeve member 34 are joined to normally prevent inward axial movement of the shaft 30 relative to the sleeve 34 by a plurality of shear pins 48 which are molded in situ within aligned, radially extending holes in the shaft and sleeve members 30 and 34 and which extend between the two members. When a predetermined axial load or impact force is exerted against the steering shaft assembly 28, the shear pins 48 are sheared and the shaft member 30 and the sleeve member 34 telescope or collapse axially inward relative to each other.

The shift tube assembly 10 of the present invention broadly comprises a cylindrical upper member 50, a lower cylindrical member 52 and a plastic locking sleeve 54 which is positioned intermediate the members 50 and 52 for normally preventing relative angular movement therebetween and axially inward collapse of the shift tube assembly 10.

The upper member 50 is a hollow, generally cylindrical member which is formed with successive portions having progressively smaller diameters proceeding from its lower end toward its upper end. The upper member 50 has three axially extending, circumferentially spaced rectangular slots 56 in its lower end portion 57, as shown in FIGS. 3 and 4. The slots 56 are circumferentially spaced approximately 120° apart from each other. The slots 56 are defined by an upper side edge 56a of the member 50. The upper side edges 56a are linearly tapered to form a sharp or knife edge 58 at the outer periphery of the upper member 50. The lower end 57a of the upper member 50 also has a beveled cam surface 57b which tapers upwardly and radially outwardly from the inner periphery 62 to the outer periphery 60 of the upper member 50.

The upper member 50 of the shift tube assembly 10 has its upper end portion 63, as shown in FIG. 2, mounted and circumferentially supported within a shift tube support block 65 which is adjacent the upper end of the steering column 22. Further, the upper end portion 63 of the upper member 50 is press fitted within an inner hub 67 of a shift barrel 69 which mounts a transmission shift lever 71. The shift barrel 69 is rotatably supported upon the steering column 22, and the upper member 50 is supported in this manner in a concentric relationship about the steering shaft assembly 28.

The lower member 52 of the shift tube assembly 10 is a hollow, generally cylindrical member whose upper end portion 72 slidably receives the lower end portion 57 of the upper member 50. The upper end portion 72 of the lower member 52 also has a plurality of axially extending slots 74 which are circumferentially spaced apart approximately 120°. The lower side edge of the member defining the slots 74 is tapered to define a knife edge 76 at the inner periphery of the member 52 which is similar to the knife edges 58 of the upper member 50. The upper end 63a of the lower member 52 also has a beveled cam surface 80 which is formed as an inclined surface extending downwardly and radially outward from the inner periphery 78 to the outer periphery 77 of the lower member 52. The lower member 52 has its lower end portion 82, as shown in FIG. 2, rotatably mounted in a conventional manner in the adapter or bearing block 36 which is fixed to the lower end of the steering column 23, and the lower end portion 82 carries a conventional radially extending shift arm 84 which is operatively connected with the vehicle's power transmission selector linkage (not shown). It should be noted that the lower member 52 is supported in a concentric manner about the steering shaft assembly 28.

Now referring to FIGS. 3 and 4, the locking sleeve 54 is a hollow, generally cylindrical member made from a suitable elastic or resilient plastic material, such as that sold under the trade name of Delrin 500, and has a relatively short length in comparison to the upper and lower members 50 and 52 of the shift tube assembly 10. The locking sleeve 54 has a diameter slightly greater than the diameter of the lower end portion 57 of the upper member 50 so that it can be slidably received thereon and slightly less than the diameter of the upper end portion 72 of the lower member 52 so that it can be slidably received therein. The locking sleeve 54 includes three circumferentially spaced axially and radially inwardly extending tabs or projections 86, as shown in FIGS. 3 and 4. The tabs 86 are formed integrally with the inner periphery 87 of the locking sleeve 54 and are spaced 120° apart. The projections 86 are generally rectangular in shape and the locking sleeve 54 has a thickness in the area of each projection 86 of approximately twice the thickness of the remainder of the sleeve 54. Further, the projections 86 are positioned at approximately the midpoint of the length of the locking sleeve 54 and are received within the slots 56 of the upper member 50.

The locking sleeve 54 also includes a series of axially and radially outwardly extending projections or raised ribs 88. It can be seen in the cross-sectional view of FIG. 3 that the ribs 88 differ from the tabs 86 of the locking sleeve 54 in that the radial thickness of the ribs 88 is substantially the same as the radial thickness of adjacent areas of the sleeve 54. The ribs 88 are generally rectangular in shape and are formed at approximately the midpoint of the overall length of the locking sleeve 54. Further, the ribs 88 are circumferentially spaced approximately 120° apart and at positions approximately one-half way between the circumferential positions of the tabs 86. The locking sleeve 54 also includes a plurality of circumferentially spaced spacer ribs 92 which extend axially for substantially the entire length of the sleeve 54 and which project radially outwardly from the outer periphery 90 of the sleeve 54 at positions immediately adjacent the tabs 86. Crush ribs 92 also extend radially inwardly from the inner periphery 87 of the sleeve at circumferentially spaced positions adjacent the opposite sides of the impressions 88, as shown in FIG. 4. The locking sleeve 54 also includes a flange 94 which projects radially outward from the outer periphery 90 at the upper end of the sleeve 54 and a flange 96 which projects radially inward from the inner periphery 87 at the lower end of the sleeve 54.

The upper member 50, the lower member 52, and the locking sleeve 54 are assembled together to normally prevent relative angular movement therebetween and axially inward collapse of the shift tube assembly 10 as will now be described. The locking sleeve 54 is first axially moved over the lower end portion 57 of the upper member 50. As the locking sleeve 54 is moved thereover the cam surface 57b engages and deflects the projections 86 radially outwardly which causes the locking sleeve 54 to expand radially. In this respect, the ribs 88 provide for the expansion of the locking sleeve 54. That is, the locking sleeve 54 flexes circumferentially in the areas of the sides 88a of the ribs 88. In this manner, the projections 86 are allowed to pass the lower end 57a of the upper member 50. The locking sleeve 54 is moved or slid onto the lower end portion 57 of the upper member 50 until flange 96 engages the lower end 57a, and thereafter the sleeve 54 can be manually rotated until the tabs 86 are aligned with the slots 56 of the upper member 50. When the tabs 86 are aligned with the slots 56, the locking sleeve 54 contracts to its former size due to its resilient properties and the projections 86 are received within the slots 56 to attach the sleeve 54 upon the upper member 50.

The lower end portion 57 of the upper member 50 with the locking sleeve 54 thereon is then inserted into the upper end portion 72 of the lower member 52. As the upper member 50 is received within the lower member 52, the cam surface 80 engages the projections 88 and depresses the ribs 88 radially inward, as should be understood from their construction, to allow the upper member 50 and locking sleeve 54 to be received further within the lower member 52. When the flange 94 reaches a position immediately adjacent the upper end 63a of the lower member 52, the upper member 50 can be manually rotated to align the deflected ribs 88 with the slots 74 of the lower member 52. When the ribs 88 are aligned with the slot 74, the projections 88 deflect to their normal radially outward position due to the resiliency of the material from which the locking sleeve 54 is made and are thereby received within the slots 74. When the locking sleeve 54 is assembled to the members 50 and 52, the spacer ribs 92 projecting radially inwardly from the inner periphery 87 of the sleeve 54 and radially outwardly from the outer periphery of the sleeve 54 are engaged and deformed by the upper and lower members 50 and 52 and provide a firm and rigid engagement between the sleeve 54 and the upper and lower members 50 and 52. The projections 86 and 88 by their reception within the slots 56 and 74, respectively, serve to normally prevent relative angular movement between the upper and lower members 50 and 52. Further, the projections 86 and 88 and the flanges 94 and 96 by their engagement with upper and lower ends 63a and 57a, respectively, serve to normally prevent axially inward collapse of the shift tube assembly 10. In this manner, a sufficiently rigid assembly is provided which will transmit movement from the shift lever 71 to the shift arm 84 which in turn is operative to move the transmission selector linkage to effect the different modes of operation of the vehicle's power transmission.

As was previously stated, the steering column assembly 12 is collapsible when an axially inward load or impact force in excess of a predetermined magnitude is applied thereto. As the steering column assembly 12 collapses axially inward, the energy absorbing mesh portion 26 of the steering column 22 yields and absorbs the impact forces while the steering column assembly 12 collapses.

In this respect, the shift tube assembly 10 also collapses axially inward as will now be described. When an axial force in excess of a predetermined magnitude is applied to either end of the steering column assembly 12 and, hence, the shift tube assembly 10, relative axial movement between the upper and lower members 50 and 52 occurs. During this relative axial movement the locking sleeve 54 is deformed in one of three ways to allow the axially inward collapse of the shift tube assembly 10. First, referring to FIG. 5, the knife edge 76 of the slots 74 of the lower member 52 can shear and/or deform the projections 88 of the locking sleeve 54 and the upper end 63a of the lower member 52 can shear the flange 94 of the sleeve 54. Under such circumstances, the locking sleeve 54 is caused to remain engaged with the lower end 57 of the upper member 50 while the upper and lower members 50 and 52 travel axially relative to each other. Second, referring to FIG. 6, the knife edges 58 at the upper side of the slots 56 in the lower end portion 57 of the upper member 50 can shear the tabs 86 and the lower end 57a can shear the flange 96 of the sleeve 54. Under these circumstances, the locking sleeve 54 remains engaged with the upper end portion 72 of the lower member 52 while the upper and lower members 50 and 52 travel axially relative to each other. Third, both of the above-described circumstances can occur simultaneously.

It should be noted that the primary resistance to the axially inward collapse of the shift tube assembly 10 is provided by the engagement of the flanges 94 and 96 with the upper end 63a of the lower member 52 and the lower end 57a of the upper member 50, respectively. The engagement between the upper and lower members resulting from the reception of the tabs 86 within the slots 56 and the impressions 88 within the slots 74 is primarily intended to prevent relative angular movement between the upper and lower members 50 and 52 and provides only an incidental or additional restraint to the axially inward collapse of the shift tube assembly 10. Regardless of the form of the deformation of the locking sleeve 54, the shift tube assembly 10 is caused to collapse axially inward when an axial force in excess of a predetermined magnitude is axially applied against the steering column assembly 12.

It should be noted that one of the advantages of the present invention is that after the shift tube assembly has collapsed axially inward, the shift tube assembly 10 can be readily repaired because a new locking sleeve 54 can be manually assembled to the upper and lower members 50 and 52. In this respect, the present invention presents a decided advantage over those shift tube assemblies which have their components attached via shear pins or keys which are molded in situ. Further, another advantage of the present invention is that the plastic locking sleeve 54 prevents metal to metal contact between the upper and lower members 50 and 52.

The foregoing disclosure relates to only one embodiment of the invention which may be modified within the scope of the appended claims.

What is claimed is:

1. A collapsible shift tube assembly for use in a collapsible steering column assembly, comprising: a generally cylindrical upper member having a plurality of circumferentially spaced slots adjacent its lower end portion; a hollow lower member shaped generally complementary to said upper member and having an upper portion receiving said lower end portion of said upper member; said lower member having a plurality of circumferentially spaced slots in said upper end portion; a locking sleeve disposed intermediate said upper and lower members and having radially inwardly and outwardly extending projections received within said slots of said upper and lower members respectively for joining said upper and lower members together to prevent relative angular movement therebetween, said sleeve also having radially extending flange means cooperable with the lower end of said upper member and the upper end of said lower member for normally preventing axially inward collapse of said shift tube assembly, and said flange means being shearable when a force in excess of a predetermined magnitude is applied against said shift tube assembly to allow said shift tube assembly to collapse axially inward.

2. A collapsible shift tube assembly for use with a collapsible steering column assembly, comprising: a generally cylindrical upper member having a plurality of circumferentially spaced slots adjacent its lower end portion and having a cam surface adjacent its lower end portion; a hollow lower member shaped generally complementary to said upper member and having a plurality of circumferentially spaced slots adjacent its upper end portion and having a cam surface adjacent its upper end; a cylindrically shaped resilient locking sleeve slidably received within said lower member and upon said upper member, said locking sleeve having a plurality of radially inwardly extending, relatively non-resilient projections and a plurality of radially outwardly extending, resilient projections which are circumferentially elongatable to allow limited expansion of said locking sleeve, said radially inwardly extending projections being engaged and deflected radially outwardly by said cam surface of said upper member to effect expansion of said locking sleeve when said locking sleeve is slidably received on said upper member until said radially inwardly extending projections are aligned with said slots whereupon said resilient locking sleeve contracts and said projections are received within said slots to connect said locking sleeve to said upper member, said cam surface on said lower member engaging said radially outwardly extending projection and deflecting the same radially inwardly when said locking sleeve is slidably received within said lower member until said radially outwardly extending projections are aligned with said slots whereupon said outwardly extending projections deflect outwardly and are received within the slots to connect said locking sleeve to said lower member to normally prevent relative angular movement therebetween, said locking sleeve also having a radially inward extending flange at its lower end being engaged with the lower end of said upper member when said locking sleeve is slidably received thereon, said locking sleeve having a radially outward extending flange at its upper end being engaged with the upper end of said lower member when said locking sleeve is slidably received therein, said radially inward and outward extending flanges normally serving to prevent axially inward collapse of said shift tube assembly, and said flanges being shearable when an axial force in excess of a predetermined magnitude is applied against said shift tube assembly to allow said shift tube assembly to collapse axially inward.

3. A collapsible shift tube assembly for use in a collapsible steering column assembly, comprising: a generally cylindrical upper member having a plurality of circumferentially spaced, axially extending slots adjacent its lower end portion, said upper member having knife edges adjacent the upper ends of said slots, said upper member having an inclined cam surface at its lower end; a hollow lower member shaped generally complementary to the lower end portion of said upper member having a plurality of circumferentially spaced, axially extending slots adjacent its upper end portion, said lower member having knife edges adjacent the lower ends of said slots, said lower member having an inclined cam surface at its upper end; a resilient locking sleeve shaped generally complementary to the lower end of said upper member and being slidably received thereon and being shaped generally complementary to the upper end of the lower member and being slidably received therein, said locking sleeve having a plurality of circumferentially spaced and axially extending projections which are relatively non-resilient and project radially inward, said locking sleeve having a plurality of circumferentially spaced and axially extending resilient projections which project radially outward and which are circumferentially elongated to allow for limited expansion of said locking sleeve, said radially inwardly extending projections being engaged and deflected radially outwardly by said cam surface of said upper member to effect expansion of said locking sleeve when said locking sleeve is slidably received on said upper member until said radially inwardly extending projections are aligned with said slots whereupon said resilient locking sleeve contracts and said projections are received within said slots to connect said locking sleeve to said upper member, said cam surface on said lower member engaging said radially outwardly extending projections and deflecting the same radially inwardly when said locking sleeve is slidably received within said lower member until said radially outwardly extending projections are aligned with said slots whereupon said outwardly extending projections deflect outwardly and are received within said slots to connect said locking sleeve with said lower member to prevent relative angular movement between said upper and lower members, said radially inwardly and outwardly extending projections being sheared by said knife edges of said upper and lower members upon an axial force in excess of a predetermined magnitude upon said shift tube assembly, said locking sleeve having a radially inward extending flange at its lower end engageable with the lower end of said upper member when said locking sleeve is slidably received thereon, said locking sleeve also having a radially outward extending flange at its upper end being engageable with the upper end of said lower member when said locking sleeve is slidably received therein, said radially inward and outward extending flanges normally serving to normally prevent axially inward collapse of the shift tube assembly, and said radially inward and outward extending flanges being shearable upon an axial force in excess of a predetermined magnitude upon said shift tube assembly to allow said shift tube assembly to collapse axially inward, said locking sleeve having a plurality of circumferentially spaced and axially extending spacer ribs which project radially outwardly and inwardly and are engaged with the upper end portion of said lower member and the lower end portion of said upper member.

* * * * *